Patented Jan. 26, 1932

1,842,893

UNITED STATES PATENT OFFICE

WEBSTER E. BYRON BAKER, OF BROOKLYN, NEW YORK, AND HARRY WEAVER, OF YORK HAVEN, PENNSYLVANIA

ADHESIVE COMPOSITION

No Drawing.   Application filed August 28, 1928.   Serial No. 302,644.

The principal object of the present invention is to provide a strong, water insoluble adhesive, particularly fitted for use in laying linoleum and tiles and also useful for other purposes.

The invention consists of a strong water insoluble adhesive composition of matter suitable for laying linoleum and tiles and for other purposes and comprising an emulsion of concentrated sulphite cellulose liquor, being an adhesive concentrated water soluble derivative of spent sulphite cellulose liquor from sulphite wood pulp processes, and wax, such as paraffine wax, which imparts water insolubility and strength to the extract with, or without, glycerine which when present imparts elasticity and flexibility to the compound.

The invention also comprises the improvements to be presently described and finally claimed.

The wax is melted and the extract is heated to approximately the temperature of the melted wax. About 9% more or less of melted paraffine wax is mixed with the extract making an emulsion. 5% to 10% of glycerine is incorporated into the composition. These percentages of paraffine and glycerine are calculated on the basis of the weight of the concentrated extract.

If desired there may be added mineral filler such as china clay, ground soapstone or the like in the proportion of for example from 40% to 50% calculated on the basis of the weight of the concentrated extract.

It is preferable to warm the adhesive for use.

Concentrated sulphite cellulose extract is adhesive and its use alone has been attempted, but it is soluble in water and cracks or crazes upon drying. However, in admixture with wax and glycerine, the adhesive is strong, flexible and elastic and substantially insoluble in water.

From waste liquor is extracted a number of substances adapted for a variety of uses and all well known. Some of them are tanning materials, other are road binding materials, and others are in the nature of adhesive materials. The latter are the kind that are used in this invention. In fact any of the well known adhesive products or binders made from sulphite cellulose waste liquor are suitable for use in the practice of the invention, but more particularly those made by mild oxidation, neutralization, and subsequent concentration in multiple effect evaporators.

We claim:

1. A strong water insoluble adhesive composition of matter suitable for laying linoleum and tile and for other purposes comprising an emulsion of concentrated sulphite cellulose extract, being an adhesive water soluble derivative of waste liquor from sulphite wood pulp processes and consisting primarily of substances dissolved from wood, wax which imparts water insolubility and strength, glycerine, and a filler.

2. A sticky, water insoluble, adhesive composition composed of an extract made from the waste liquor of sulphite wood pulp process by mild oxidation, neutralization, and concentration in multiple effect evaporators, emulsified with wax, glycerine and a filler.

WEBSTER E. BYRON BAKER.
HARRY WEAVER.